United States Patent Office 3,030,398
Patented Apr. 17, 1962

3,030,398
COMPLEX BIMETALLIC CYCLOPENTADIENYL ORGANOMETALLIC COMPOUNDS
Hymin Shapiro and Earl G. De Witt, Baton Rouge, La., and Jerome E. Brown, Detroit, Mich., assignors to Ethyl Corporation, New York, N.Y., a corporation of Delaware
No Drawing. Filed Aug. 3, 1959, Ser. No. 831,076
1 Claim. (Cl. 260—429.9)

The present invention relates to new compositions of matter comprising bimetallic organometallic compounds and a process for their preaparation.

Certain bimetallic organometallic compounds are known. These include alkyl and aryl compounds containing the group I–A metals, e.g. sodium, and the group III–A metals, e.g. boron and aluminum. For example, sodium tetraphenylboron is now available commercially. Other similar compounds of lithium and sodium with aluminum or boron are also well known containing both organic and inorganic anions, such as the hydrides.

The above bimetallic compounds are relatively unstable and have relatively limited solubility in hydrocarbon and other organic media. These deficiencies have limited their use in large scale commercial applications.

It is accordingly an object of this invention to provide new and novel bimetallic organometallic compounds having improved stability to heat, light and moisture. A further object is to provide a novel process for the production of the aforementioned bimetallic organometallic compounds. These and other objects will be apparent from the discussion and the dependent claims.

In general, the novel compositions of matter of the present invention comprise bimetallic organometallic compounds containing a cyclopentadienyl moiety wherein one of the metals is selected from the group consisting of metals of groups I–A and II of the periodic chart of the elements, and the second metal is selected from the group consisting of elements of the group III–A metals of the periodic chart of the elements and zinc. These compounds have been found to have improved stability and greater solubility in organic solvents than those previously known. In consequence, the compounds of this invention are very effective catalyst components for olefin polymerization, dimerization and chain growth reactions. Those containing alkyl groups are also extremely effective intermediates in alkylation reactions, such as in the production of tetraalkyllead and tin from the corresponding metal or salt. Likewise, cyclopentadienyl metal compounds can be produced, such as bis(cyclopentadienyl) lead by the reaction of the compounds of this invention, e.g. sodium aluminum tetrakis(cyclopentadienide) with lead or lead salts or other group IV–A metals or metal salts.

More specifically, the compositions of matter of the present invention have the general formula:

$$M(M'R_{(y+1)})_x$$

wherein M and M' are dissimilar metals; M is a metal selected from the group consisting of group I–A and II of the periodic chart of the elements; M' is a metal selected from the group consisting of metals of group III–A of the periodic chart of the elements and zinc; R is a monovalent anion, at least one of which is a cyclopentadienyl group; x is an integer corresponding to the valence of the metal M; and y is an integer equal to the valence of the metal M'. The cyclopentadienyl group is bonded to the metal through a cyclopentadienyl ring carbon atom.

The metals designated by M include lithium, sodium, potassium, rubidium, cesium, beryllium, magnesium, calcium, strontium, barium, zinc, cadmium, and mercury. Francium and radium would be suitable for the compounds of the invention except that they are too rare to be of any importance.

The metal M' includes any of the elements of group III–A and includes boron, aluminum, gallium, indium, and thallium. Zinc is also suitable for M'.

As noted above, at least one of the R groups is a cyclopentadienyl group. By a cyclopentadienyl group is meant groups containing the five carbon atom ring found in cyclopentadiene itself, such as the indenyl and fluorenyl groups and substituted derivatives thereof. All four of the R groups can be the same or different cyclopentadienyl groups, e.g. sodium aluminum tetracyclopentadienide or lithium boron bis(cyclopentadienide) bis(methylcyclopentadienide). Also, one or more of the other three R groups can be of a different type monovalent anion. These anions include hydrogen, organic hydrocarbon radicals, and substituted hydrocarbon radicals including the halogenated hydrocarbons, residues of organic acids containing up to about 20 carbon atoms, such as the acetate, propionate, butyrate, hexanoate, alcoholates, e.g. methylate propionate and other similar groups having up to 30 carbon atoms; and inorganic anions, such as the halides, hydrides, cyanates, thiocyanates, cyanides, cyanamides, amides, and the like.

The compounds of this invention are preferably prepared by admixing in appropriate proportions organometallic or metal salts of the appropriate metals as defined above, at least one of the metal compounds containing a cyclopentadienyl moiety. The reaction of these metal compounds can be carried out in a solvent system or preferably, if one of the components is a liquid at reaction conditions, in the absence of any solvent. Normally, the inter-combination can be conducted over a wide temperature range usually at a temperature ranging between from 0 to 300° C., and preferably from room temperature to the boiling temperature of the system. Thus, when a solvent is employed, the reaction is conveniently carried out from room temperature to the reflux temperature of the solvent.

Typical examples of compounds in accordance with the present invention are

Lithium boron tetrakis(cyclopentadienide),
Lithium aluminum tetrakis(cyclopentadienide),
Lithium aluminum tetrakis(methylcyclopentadienide),
Lithium gallium tetrakis(cyclopentadienide),
Lithium indium tetrakis(ethylcyclopentadienide),
Lithium boron cyclopentadienide trihydride,
Lithium boron tris(cyclopentadienide)hydride,
Lithium aluminum tris(cyclopentadienide)hydride,
Lithium aluminum cyclopentadienide triethyl,
Lithium aluminum bis(cyclopentadienide)diethyl,
Lithium aluminum cyclopentadienide trimethyl,
Sodium aluminum cyclopentadienide triisobutyl,
Sodium aluminum cyclopentadienide diethyl hydride,
Sodium aluminum cyclopentadienide trifluoride,
Sodium aluminum cyclopentadienide diethyl chloride,
Sodium aluminum cyclopentadienide ethyl dichloride,
Sodium aluminum cyclopentadienide ethyl dibromide,
Sodium aluminum cyclopentadienide ethyl difluoride,
Sodium aluminum cyclopentadienide ethyl diiodide,
Sodium aluminum tris(cyclopentadienide)chloride,
Sodium aluminum tris(cyclopentadienide)fluoride,
Sodium gallium tris(cyclopentadienide)ethyl,
Sodium gallium tetrakis(cyclopentadienide),
Sodium indium tetrakis(cyclopentadienide),
Sodium thallium cyclopentadienide trichloride,
Potassium boron tetrakis(cyclopentadienide),
Potassium boron tris(cyclopentadienide)hydride,
Potassium boron tris(cyclopentadienide)ethyl,
Potassium boron tris(cyclopentadienide)chloride,
Potassium boron cyclopentadienide triethyl,
Potassium boron cyclopentadienide trihydride, Potassium boron cyclopentadienide trichloride,
Potassium aluminum tetrakis(cyclopentadienide),
Potassium aluminum tetrakis(indenide),
Rubidium aluminum tetrakis(cyclopentadienide),
Rubidium aluminum cyclopentadienide triethyl,
Cesium boron tetrakis(cyclopentadienide),
Cesium aluminum tetrakis(cyclopentadienide),
Beryllium bis(boron cyclopentadienide triethyl),
Beryllium bis[aluminum tetrakis(cyclopentadienide)],
Beryllium bis[aluminum tris(cyclopentadienide)ethyl],
Beryllium bis(aluminum cyclopentadienide triethyl),
Magnesium bis [boron tetrakis(cyclopentadienide)],
Magnesium bis(boron cyclopentadienide triphenyl),
Magnesium bis(aluminum cyclopentadienide trimethyl),
Magnesium bis[aluminum tris(cyclopentadienide)chloride],
Magnesium bis(aluminum cyclopentadienide tribromide),
Calcium bis(boron cyclopentadienide trichloride),
Calcium bis(boron cyclopentadienide trihydride),
Strontium bis[gallium tetrakis(cyclopentadienide)],
Barium bis[indium tetrakis(fluorenide)],
Zinc bis[boron tetrakis(cyclopentadienide)],
Zinc bis[aluminum tetrakis(cyclopentadienide)],
Zinc bis(aluminum cyclopentadienide triethyl),
Cadmium bis[aluminum tetrakis(cyclopentadienide)],
Mercury bis(boron cyclopentadienide trihydride),
Mercury bis(aluminum cyclopentadienide trihydride),
Mercury bis(aluminum cyclopentadienide trichloride),
Mercury bis(gallium tetracyclopentadienide),
Lithium zinc tris(cyclopentadienide),
Sodium zinc tris(cyclopentadienide),
Sodium zinc bis(cyclopentadienide)ethyl, and
Sodium zinc cyclopentadienide dichloride.

In addition to the compounds above, similar compounds can be made containing other substituted cyclopentadienyl groups including the isopropyl, diisopropyl, hexyl, tolyl, xylyl, and other alkyl and aryl substituted cyclopentadienyl groups.

The following examples illustrate the novel compositions of matter and process of the present invention.

EXAMPLE I

To a reaction vessel containing 100 parts of toluene at room temperature was added 4.5 parts of sodium and a stoichiometric quantity of cyclopentadiene in monomeric form. A reaction took place forming insoluble cyclopentadienyl sodium. To the reaction product at 0° C. was added 22.3 parts of triethylaluminum and the mixture was thereafter maintained at room temperature with agitation. The complex sodium cyclopentadienyl triethyl-aluminum was soluble in the toluene. The toluene was thereafter removed by distillation and the crystalline product recovered as a solid having the formula $$NaAl(C_5H_5)(C_2H_5)_3$$

M.P. 80° C.

This example was repeated in diethylene glycol dimethyl ether giving an etherated solid having the formula $NaAl(C_5H_5)(C_2H_5)_3$. This compound is stable in alcohol.

The sodium aluminum cyclopentadienyl triethyl prepared as above is an extremely effective catalyst for the polymerization of olefins, such as ethylene. This compound used in equimolar concentration with titanium tetrachloride or trichloride will polymerize ethylene, propylene, and other hydrocarbon olefins to high molecular weight polymers. Polymerization can be carried out in either the presence or absence of a solvent, such as aliphatic and aromatic hydrocarbons, e.g. hexane or toluene. Polymerization is effectively conducted at temperatures from about 0 to 150° C. using olefin pressures of from atmospheric to about 50,000 pounds. The compound prepared as in Example I is also a very effective catalyst for effecting dimerization of propylene and butylene, either by itself or in the presence of a cocatalyst, such as the titanium halides, the dimerization being conducted at elevated temperatures and preferably in the presence of aromatic solvents. Chain growth reactions can be conducted to give higher molecular weight organometallics using ethylene, for example, to give products having from 10 to 30 carbon atoms per alkyl chain.

EXAMPLE II

Cyclopentadienyl sodium prepared as in Example I is reacted with a stoichiometric quantity of diethyl aluminum hydride. The latter is prepared by reacting ethylene and hydrogen with aluminum metal in the presence of aluminum triethyl. The reaction of the cyclopentadienyl sodium with the diethyl aluminum hydride is carried out in 100 parts of hexane at a temperature of 65° C. The compound produced is sodium aluminum cyclopentadienide diethyl hydride.

EXAMPLE III

Example II is repeated except that ethylaluminum dichloride is employed instead of the diethyl aluminum hydride and heptane is employed as the solvent. The reaction is carried out at 90° C. The sodium aluminum cyclopentadienide ethyl dichloride is formed in stoichiometric quantities.

EXAMPLE IV

Cyclopentadienyl sodium is reacted with aluminum tris(cyclopentadienide) in diethyl ether solvent at 40° C. The aluminum tris(cyclopentadienide) is prepared in a stirred reactor in diethyl ether solvent by reacting 8.1 parts of finely divided aluminum metal with bis(cyclopentadienyl)mercury. The aluminum metal was preactivated by contact with a diethyl ether solution of anhydrous hydrogen chloride. The bis(cyclopentadienyl) mercury is prepared by the method of Wilkinson and Piper, J. Inorg. Nucl. Chem. 2, 32 (1956).

EXAMPLE V

One mole of aluminum tris(cyclopentadienide) is reacted with ½ mole of sodium fluoride in tetrahydrofuran solvent. The sodium aluminum tris(cyclopentadienide) fluoride product is recovered in good yield.

EXAMPLE VI

A mole of aluminum tris(cyclopentadienide) as prepared in Example IV is reacted with a stoichiometric quantity of sodium hydride in dioxane solvent. A smooth reaction takes place to produce sodium aluminum tris(cyclopentadienide) hydride in quantitative yield.

EXAMPLE VII

Example VI is repeated except that sodium chloride is employed instead of sodium hydride and the product is sodium aluminum tris(cyclopentadienide) chloride.

EXAMPLE VIII

Example I was repeated except that boron triethyl instead of aluminum triethyl and the product produced was sodium boron cyclopentadienyl triethyl. This material was identified as a true compound by conductometric titration. This compound is also useful in polymerization chain growth and isomerization reactions whereby internal olefins can be treated to remove the unsaturation to a terminal position.

EXAMPLE IX

Lithium boron tetrakis(cyclopentadienide) is prepared by reacting cyclopentadienyl lithium with boron tris(cyclopentadienide). The boron compound is prepared by adding cyclopentadienyl lithium in ether to anhydrous boron trichloride dissolved in anhydrous diethyl ether. 15.2 parts of the boron trichloride is used with 91 parts of the diethyl ether, the cyclopentadienyl lithium being used in stoichiometric amounts. The orange colored tris- (cyclopentadienyl) boron solution is then reacted with the cyclopentadienyl lithium.

EXAMPLE X

Example IX is repeated except that diborane is reacted with cyclopentadienyl sodium in xylene solvent at reflux temperature. The sodium boron cyclopentadienide trihydride is recovered in excellent yield. When this experiment is repeated using boron trifluoride, similar results are obtained except that the product is sodium boron cyclopentadienide trifluoride.

EXAMPLE XI

Sodium cyanide is reacted with the boron cyclopentadienide prepared as in Example IX to produce sodium boron tris(cyclopentadienide) cyanide. The reaction is carried out in butyl ether at the reflux temperature of the reaction mixture.

The following examples are carried out similarly to Example I and give excellent yields of the product using the conditions set forth in the following table.

Table

| Ex. No. | Reactants | | Temp., °C. | Solvent | Product |
|---|---|---|---|---|---|
| XII | NaCN | AlCp$_3$ | Reflux | xylene | NaAlCp$_3$CN |
| XIII | NaOCN | AlCp$_3$ | Reflux | xylene | NaAlCp$_3$OCN |
| XIV | RbH | BCp$_3$ | 50 | toluene | RbBCp$_3$H |
| XV | LiNH$_2$ | AlCp$_3$ | 60 | decane | LiAlCp$_3$NH$_2$ |
| XVI | CsCl | AlCp$_3$ | 40 | benzene | CsAlCp$_3$Cl |
| XVII | SrBr$_2$ | BCp$_3$ | 80 | xylene | Sr(BCp$_3$Br)$_2$ |
| XVIII | Ba(SCN)$_2$ | AlCp$_3$ | 65 | benzene | Ba(AlCp$_3$SCN)$_2$ |
| XIX | NaAc | AlCp$_3$ | 70 | toluene | NaAlCp$_3$Ac |
| XX | ZnEt$_2$ | AlCp$_3$ | 50 | none | Zn(AlCp$_3$Et)$_2$ |
| XXI | NaCp | ZnEt$_2$ | 30 | xylene | NaZnCpEt$_2$ |
| XXII | CdEt$_2$ | AlCp$_3$ | 50 | none | Cd(AlCp$_3$Et)$_2$ |
| XXIII | HgEt$_2$ | AlCp$_3$ | 50 | none | Hg(AlCp$_3$Et)$_2$ |

Cp=cyclopentadienide group.
Ac=acetate.
Et=ethyl.

The above examples illustrate the production of various metal compounds contaning a variety of cyclopentadienyl groups. Similar compounds can be produced with other cyclopentadienyl moieties including dimethyl cyclopentadienyl, isopropyl cyclopentadienyl, tertiary butyl cyclopentadienyl, amyl cyclopentadienyl, eicosyl cyclopentadienyl, ethenyl cyclopentadienyl, phenylethyl cyclopentadienyl, benzyl cyclopentadienyl, methyl indenyl, phenyl fluorenyl and the like using the same conditions employed above. Other compounds which can be made in accordance with this invention using the techniques of the above examples include: sodium boron tris(cyclopentadienide) cyanide, sodium boron cyclopentadienide tricyanide, sodium boron tris(cyclopentadienide) cyanate, sodium aluminum tris(cyclopentadienide)amide, sodium aluminum cyclopentadienide triamide, sodium aluminum tris(cyclopentadienide)thiocyanate, sodium aluminum tris(cyclopentadienide)propanoate, sodium aluminum tris(cyclopentadienide) butyrate, lithium aluminum tris(cyclopentadienide)cyanide, lithium aluminum cyclopentadienide tricyanide, lithium aluminum cyclopentadienide tricyanate, beryllium bis(boron cyclopentadienide trihydride), sodium gallium tetrakis(cyclopentadienide), sodium indium tetrakis(cyclopentadienide), sodium thallium tetrakis(cyclopentadienide), and the like.

The above examples illustrate a variety of solvents which can be effectively used in the preparation of the compounds of this invention. The solvents which are particularly preferred are the hydrocarbons and ethers, especially the cyclic ethers, such as tetrahydrofuran and the lower alkyl ethers of polyethers, particularly those in which the alkyl groups have from 1 to 4 carbon atoms. Especially preferred are the ethylene glycol and diethylene glycol alkyl ethers. The proportions of the solvents used in the present process can vary over a wide range, i.e. between about 1 to 100 parts by weight per part of the bimetallic organometallic reactants. Best results are obtained when the solvent is employed only in sufficient quantities to maintain a fluid reaction system.

In all of the above examples, the reaction is conducted in an inert atmosphere so as to prevent any undesired side reactions with the atmosphere. Suitable inert atmospheres include nitrogen, argon, neon, krypton, and the like inert gases.

Other compounds in accordance with the present invention can be produced by different processes than those set forth above. Thus, a convenient method of preparing certain of the compounds involves a re-distribution reaction in which two or more compounds in accordance with the present invention can be reacted to re-distribute organic or inorganic groups on the metals. Thus, for example, sodium aluminum tetrakis(cyclopentadienide) can be reacted with sodium aluminum tetrakis (methylcyclopentadienide) to form the corresponding mixed compounds; i.e., sodium aluminum tris(cyclopentadienide) methylcyclopentadienide, sodium aluminum bis(cyclopentadienide) bis(methylcyclopentadienide) and sodium aluminum cyclopentadienide tris(methylcyclopentadienide). In the same manner, for example, aluminum tris(cyclopentadienide) can be reacted with aluminum tris(methylcyclopentadienide) and the corresponding mixed compounds thereafter reacted with the group I and group II metal compounds to form the complex compounds of this invention. Likewise, aluminum tris(cyclopentadienide) can be reacted with triethyl aluminum, for example, to form aluminum cyclopentadienide diethyl and aluminum bis(cyclopentadienide) ethyl, which compounds can be thereafter reacted with a group I or group II metal compound to produce compounds in accordance with the present invention. By using the above techniques, therefore, compounds can be readily produced containing from 1–4 cyclopentadienide groups with any of the organic or inorganic anions discussed in detail above.

Typical other compounds which can be made by the process of this invention include lithium boron bis(cyclopentadienide) dimethyl, sodium boron bis(cyclopentadienide) diethyl, sodium boron bis(cyclopentadienide) dichloride, potassium boron bis(cyclopentadienide) dihydride, lithium aluminum bis(cyclopentadienide) dichloride, lithium aluminum bis(methylcyclopentadienide) dimethyl, lithium aluminum cyclopentadienide diethyl, lithium aluminum bis(cyclopentadienide) diisobutyl, sodium aluminum bis(cyclopentadienide) dihydride, sodium aluminum bis(cyclopentadienide) dichloride, sodium aluminum bis(cyclopentadienide) dimethyl, sodium aluminum bis(cyclopentadienide) diethyl, sodium aluminum bis(cyclopentadienide) diisopropyl, sodium aluminum bis(methylcyclopentadienide) diethyl, potassium gallium bis(cyclopentadienide diethyl, rubidium indium bis(cyclopentadienide) dichloride, magnesium bis[aluminum bis(cyclopentadienide)diethyl] and the like.

In carrying out the re-distribution reaction, the reaction can be conducted either in the presence or absence of a catalyst. Excellent results are obtained using a Friedel-Crafts catalyst at temperatures of 0–250° C. in a concentration of less than 10 mole percent, preferably 0.1–1.0 percent. Aluminum-containing catalysts, such as aluminum chloride, are preferred. Other aluminum compounds can be used, such as the alcoholates; e.g., methylate, propionate, butyrate, phenolate and the like.

The novel bimetallic compounds described above are relatively stable and very soluble in organic media. The specific physical characteristics of the compounds vary dependent upon the metals involved and the type or chain length of the hydrocarbon groups or other substituents contained in the compound. However, in all instances, they are relatively soluble or complex with typical organic solvents, such as the ethers, hydrocarbons, and tertiary amines.

As noted above, the compounds of this invention have great utility due to their desirable novel characteristics. Thus, they are extremely effective catalyst components for polymerization, such as the hydrocarbon olefins, being especially useful in combination with the group IV–B, V–B, and VI–B metal salts, such as titanium tetrachloride, or titanium trichloride. When used as catalysts, they are preferably employed in about stoichiometric quantities with the metal salt; and the polymerization is conducted by passing the olefin to be polymerized into contact with the catalyst while the same is dissolved in an organic medium, such as an aliphatic hydrocarbon. The increased solubility of the compounds of this invention make these compounds especially desirable for this utility.

Having thus described the novel compositions of this invention, it is not intended that the application be limited except as set forth in the following claim.

We claim:

As a new composition of matter, a cyclopentadienyl bimetallic organometallic compound having the general formula $$M(M'R_{(y+1)})_x$$

wherein M is a metal selected from the group consisting of group I–A and II of the periodic chart of the elements; M' is a metal selected from the group consisting of an element of group III–A of the periodic chart of the elements and zinc; R is a monovalent anion selected from the group consisting of a hydrocarbon radical, residues of organic acids, alcoholates, halides, hydrides, cyanates, thiocyanates, cyanides, and amides, at least one R in said composition being a hydrocarbon cyclopentadienyl radical, and $x$ is an integer equal to the valence of the metal M and $y$ is an integer equal to the valence of M'.

References Cited in the file of this patent
UNITED STATES PATENTS
2,699,457    Ziegler et al. _____ Jan. 11, 1955

OTHER REFERENCES
Woodward et al.: J. American Chemical Society, vol. 74, page 3458–9 (1952).